(12) United States Patent
Mann

(10) Patent No.: US 9,788,526 B2
(45) Date of Patent: Oct. 17, 2017

(54) PET TOY FOR RETAINING REPLACEABLE TREATS, AND METHODS

(75) Inventor: Charles David Mann, Marine of St. Croix, MN (US)

(73) Assignee: Premier Pets Products, LLC, Midlothian, VA (US)

( * ) Notice: Subject to any disclaimer, the term of this patent is extended or adjusted under 35 U.S.C. 154(b) by 1443 days.

(21) Appl. No.: 11/858,675

(22) Filed: Sep. 20, 2007

(65) Prior Publication Data
US 2009/0078214 A1 Mar. 26, 2009

(51) Int. Cl.
*A01K 15/02* (2006.01)

(52) U.S. Cl.
CPC .......... *A01K 15/025* (2013.01); *A01K 15/026* (2013.01)

(58) Field of Classification Search
CPC .......................... A01K 15/025; A01K 15/026
USPC ......................... 119/707, 711, 709
See application file for complete search history.

(56) References Cited

U.S. PATENT DOCUMENTS

| | | | |
|---|---|---|---|
| 2,959,354 A * | 11/1960 | Beck ................................ | 239/36 |
| 4,513,014 A | 4/1985 | Edwards | |
| 4,542,714 A * | 9/1985 | Ingraham et al. ............ | 119/708 |
| 4,557,219 A | 12/1985 | Edwards | |
| 4,802,444 A | 2/1989 | Markham et al. | |
| 5,022,345 A | 6/1991 | Bolivar et al. | |
| 5,343,828 A | 9/1994 | Houghton et al. | |
| 5,474,025 A * | 12/1995 | Lee ............................... | 119/464 |
| 5,553,570 A | 9/1996 | VanNatter, III et al. | |
| 5,819,690 A | 10/1998 | Brown | |
| 5,832,877 A | 11/1998 | Markham | |
| 5,865,146 A | 2/1999 | Markham | |
| 5,947,061 A | 9/1999 | Markham et al. | |
| 6,112,703 A * | 9/2000 | Handelsman ................. | 119/707 |
| 6,129,053 A | 10/2000 | Markham et al. | |
| 6,237,538 B1 | 5/2001 | Tsengas | |
| 6,289,846 B1 | 9/2001 | Long | |
| 6,439,166 B1 | 8/2002 | Markham | |
| 6,470,830 B2 | 10/2002 | Mann | |
| 6,546,896 B1 | 4/2003 | Markham | |
| 6,601,539 B1 * | 8/2003 | Snook .......................... | 119/710 |
| 6,899,059 B1 * | 5/2005 | Crane et al. .................. | 119/711 |
| 7,063,044 B2 * | 6/2006 | Handelsman et al. ........ | 119/709 |
| 7,096,826 B2 | 8/2006 | Markham | |
| RE39,563 E | 4/2007 | Markham | |
| 7,278,374 B2 | 10/2007 | Mann | |
| 2002/0174838 A1 * | 11/2002 | Crane et al. .................. | 119/707 |
| 2004/0134446 A1 * | 7/2004 | Keller ........................... | 119/707 |
| 2004/0216693 A1 | 11/2004 | Handelsman | |
| 2006/0060154 A1 | 3/2006 | Wesely | |
| 2007/0068464 A1 | 3/2007 | Smith et al. | |

FOREIGN PATENT DOCUMENTS

WO  WO 2004/043142 A1  5/2004

* cited by examiner

*Primary Examiner* — Son T Nguyen
(74) *Attorney, Agent, or Firm* — Merchant & Gould P.C.

(57) ABSTRACT

Pet toys configured to accept an edible or chewable treat which can be readily replaced. The pet toys have a first portion and a second portion which releasably engage to retain the edible treat with the toy until the treat is consumed or otherwise removed from the toy by the pet. When desired, the toy can be disassembled by removing the first portion from the second portion, new treats can be added to the toy, and the two portions reassembled.

26 Claims, 5 Drawing Sheets

PET TOY FOR RETAINING REPLACEABLE TREATS, AND METHODS

BACKGROUND OF THE INVENTION

The present invention relates to toy articles for pets, generally dogs, although can be adapted for use with other pets, such as cats. In particular, the present invention relates to chewable toys that include a chewable, synthetic portion and replaceable edible portions.

It is undeniable that some people love their pets to the extreme that they treat the pet like family. Some pet owners spare no expense for their pet, buying designer collars, leashes and beds. Many pets have sophisticated toys to play with. For some owners, the pet is their child.

Many pets, if not all, receive an edible treat every so often as a reward. For some, an edible treat is a result of the owner feeling guilty, for example, for having to leave the pet at home when the owner leaves, even for a short time. However, when the treat is consumed, the pet is lonely, having no more treats to occupy itself and having its master gone.

There have been attempts to make pet toys that dispense treats over an extended period of time, for example, for use when the owner is away from the pet. For example, there are toys that retain a cache of treats in a cavity. As the pet rolls and moves the toy, the treats are dispensed. Once the treats are gone from the cavity, the pet often loses interest in the toy.

There is always room in the pet market for additional toy designs, particularly for toys that include edible treats.

SUMMARY

The present invention is directed to pet toys configured to accept an edible or chewable treat which can be readily replaced. The pet toys of this invention have a first portion and a second portion which releasably engage to retain the edible treat with a treat-retaining region of the toy until the treat is consumed or otherwise removed from the toy by the pet. When desired, the toy can be disassembled by removing the first portion from the second portion, new treats can be added to the treat-retaining region, and the two portions reassembled.

In one particular aspect, the invention is directed to a pet toy comprising a first portion, a second portion releasably engageable to the first portion, and a treat-retaining region. A shaft may releasably engage the first portion to the second portion. The pet toy may include a passage in the first portion for accepting the shaft there through, with the shaft having external threads on a first end. The second portion would have internal threads engageable with the threads on the shaft. In some embodiments, the treat-retaining region is present between the first portion and the second portion, or is present at least partially within the first portion, or is on the shaft.

In another particular aspect, the invention is directed to a pet toy having a base portion having a passage there through, a tip portion, a shaft configured for passing through the passage in the base portion, and an engagement mechanism releasably connecting the tip portion to the base portion. The engagement mechanism may be threads on the shaft and threads in the tip portion. The pet toy may further have a second tip portion, and the shaft may have first and second threaded ends with the tip portions having threads therein. The pet toy generally has a treat-retaining region, which can be present between the base portion and the tip portion, or at least partially within the base portion.

In another particular aspect, the invention is directed to a pet toy having a plurality of base portions having a passage there through, a first tip portion and a second tip portion, a shaft configured for passing through the passage in the base portions, and an engagement mechanism releasably connecting the first tip portion to the second tip portion. The base portions may be disc, and/or may include dental cleaning features, such as nubs, bristles or protrusions, thereon.

Of course the invention includes other aspects.

DETAILED DESCRIPTION

The present invention is directed to pet toys configured to accept an edible or chewable treat which can be readily replaced as needed. The pet toys of this invention have a first portion and a second portion which engage together to retain the edible treat with the toy (e.g., either in or on the toy) until the treat is at least partially consumed or otherwise removed from the toy by the pet. When desired, the two portions of the toy can be disassembled and a replacement treat inserted into the toy, after which the two portions are reassembled. In some embodiments, the pet toy has three portions which engage together to retain one or more edible treats.

In some embodiments of the pet toys of the present invention, the two portions are configured in a manner so that the pet cannot consume the entire treat, but rather, a portion of the treat is inaccessible to the pet and remains in the toy. By leaving a portion of the treat with the toy, the pet loses interest in the toy less quickly than if the entire treat had been consumed.

Referring to the figures, numerous embodiments of pet toys in accordance with this invention are discussed below.

Figure 1:
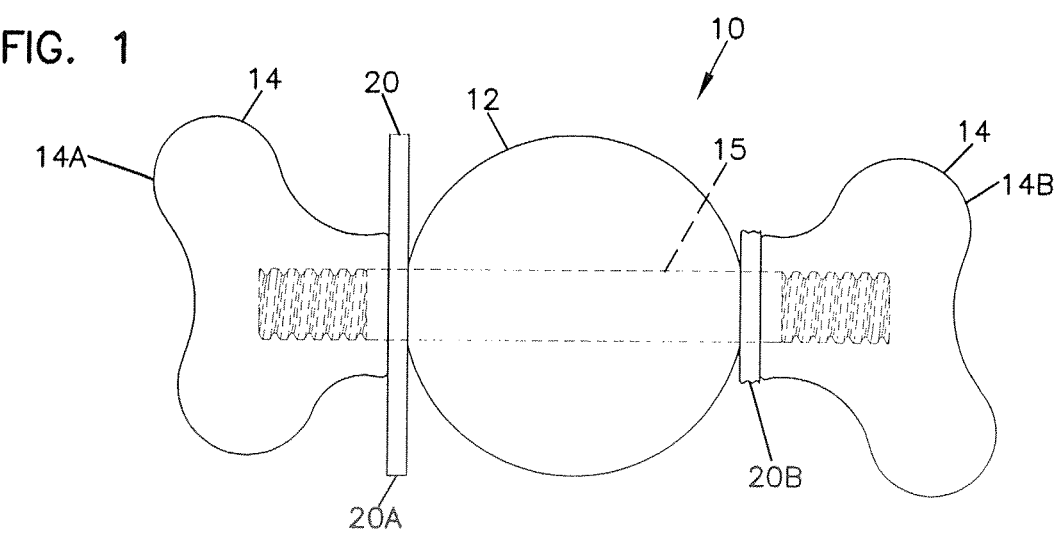
FIG. 1 is a plan view of a first embodiment of a pet toy according to the present invention having treats retained thereon.

FIG. 1 illustrates a first embodiment of a pet toy according to the present invention. Toy 10 of FIG. 1 has a first portion and a second portion that are connectable (e.g., engageable and disengageable) from each other, and toy 10 includes an edible treat or snack, which can be readily placed on toy 10. In use, the treat or snack is replaced after being at least partially consumed or otherwise removed from toy 10 by the pet.

Toy 10 includes a first portion, in this embodiment body 12, and a second portion, in this embodiment tip 14. In this particular embodiment, toy 10 has a first bone-shaped tip 14A and a second bone-shaped tip 14B positioned on opposite sides of a ball-shaped body 12. At least one of tips 14A, 14B is removable and replaceable onto body 12. For example, either or both of tips 14A, 14B could be attachable to and removable from body 12 by an engagement mechanism. For example, either or both of tips 14A, 14B could be threaded to engage with a shaft 15 extending longitudinally through body 12. Alternately, either or both of tips 14A, 14B could be threaded to engage directly with body 12. The threading many be multiple rotations or may be a partial rotation (e.g., a twist-lock). As another example, either or both of tips 14A, 14B could be pressure fit or have an engaging indent/detent relationship. A spring or other tension device could be incorporated into the engagement mechanism. In the particular embodiment of FIG. 1, each of first tip 14A and second tip 14B is threaded onto an end of shaft 15. In this embodiment, each of tips 14A, 14B has internal threads to accept and retain shaft 15. In an alternate embodiment, one tip (e.g., tip 14A) may be integral with shaft 15 and the other tip 14 (e.g., tip 14B) may be removably engageable with shaft 15. In yet another alternate embodiment, either or both of tips 14A and tip 14B could have external threads that tread into treaded recesses in body 12.

Positioned between two engageable portions, e.g., tip 14 and body 12, in the treat-retaining region of toy 10, is an edible treat 20, such as rawhide. In FIG. 1, a first treat 20A is positioned between tip 14A and body 12 and a second treat 20B is positioned between tip 14B and body 12. Treat 20 extends generally perpendicular to a longitudinally axis extending through toy 10, i.e., through tip 14A, body 12, and tip 14B. As illustrated, treat 20B has been partially consumed. The pet is able to consume that portion of treat 20 which it is able to get its front teeth (e.g., incisors) on.

Figure 1A:
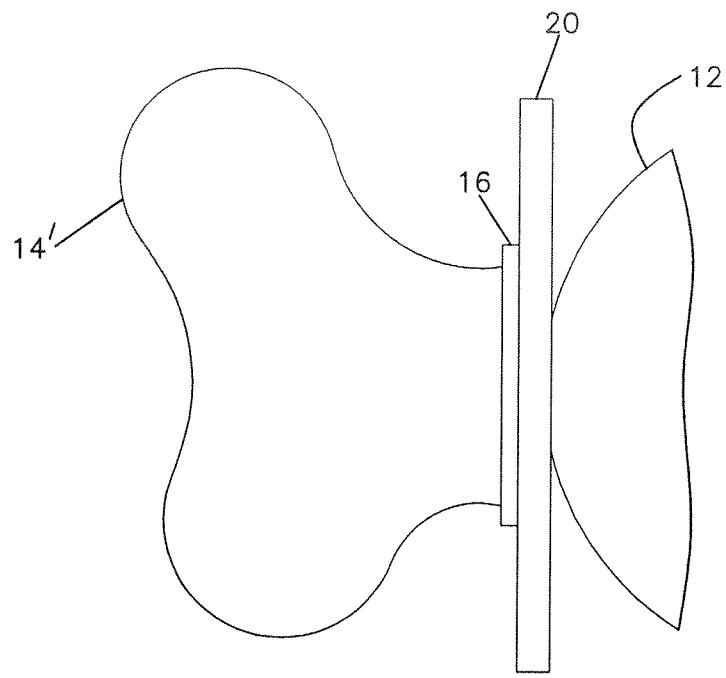
FIG. 1A is an enlarged view of an alternate embodiment of a portion of the pet toy illustrated in FIG. 1.

The two portions of toy 10 are preferably shaped so that a sufficient amount of the treat is not readily accessible to the pet. That is, the pet is preferably not able to chew the entire treat, but a portion of it is inaccessible to the pet. In FIG. 1A, an alternate embodiment of a tip, specifically tip 14', is illustrated, which increases the area of the treat inaccessible to the pet. Tip 14' has a flange 16 configured to seat against treat 20 when sandwiched between tip 14' and body 12. The two portions of toy 10, e.g., body 12 and tips 14, may also be configured to allow for rotation relative to the portions, e.g., rotation around shaft 15.

Figure 2:
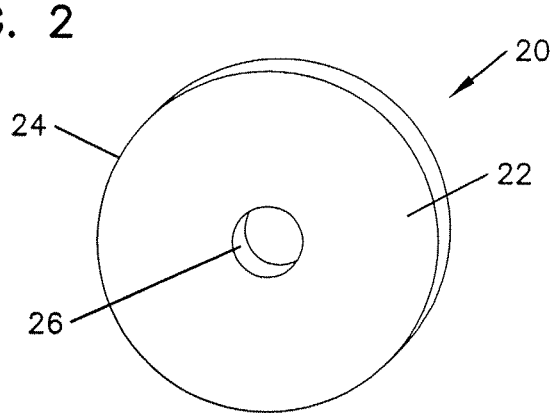
FIG. 2 is a perspective view of an edible treat configured for inclusion with the pet toy of FIG. 1.

FIG. 2 illustrates treat 20. Treat 20 has a body 22 having an outer perimeter 24 and an inner aperture 26. Aperture 26 is sized so that treat 20 can be positioned between tip 14 and body 12, either on tip 14, on body 12, or on shaft 15, depending on the configuration of the portions of toy 10. The amount of body 22 exposed depends on the configuration of tip 14 and body 12. Although treat 20 is illustrated having a circular, disc-shape, it is understood that other shapes could be used, such as, e.g., square, triangular, star-shaped, or irregular shaped. Treat 20 may be extruded, molded, pressed, or otherwise formed as desired.

Treat 20 may be any material suitable for the intended pet, typically a dog, although a chewable and/or edible material is preferred. The preferred treat material is rawhide, either natural rawhide or a manufactured (e.g., corn starch based) rawhide. Other suitable materials include dried chicken material, liver material, and the like, are known. For a cat, dried fish material could be used.

To use toy 105 the pet owner disassembles toy 10 in this embodiment toy 10 is rotated to remove either a tip (e.g., tip 14A) from shaft 15, allowing shaft 15 with the other tip (e.g., tip 14B) to be removed from body 12. A treat 20 can be positioned on shaft 15 between each tip 14A, 14B and body 12. For example, treat 20 (e.g., treat 20B) is slid over shaft 15 and positioned against tip 14B. Shaft 15, with treat 20B thereon, is then slid through body 12. A treat (e.g., treat 20A) is slid onto shaft 15 and positioned against body 12, after which tip 14A is engaged onto shaft 15. The resulting assembled toy has two edible treats thereon; it is understood that in some embodiments, only one treat may be position on toy 10 or multiple treats may be positioned on an end.

After chewing by the pet, treats 20 are at least partially consumed or otherwise removed. It is preferred that a portion of the treat, e.g., see treat 20B, is in accessible to the pet and remains on toy 10, to continue the pet's interest in toy 10. To replace the partially consumed treats 20, toy 10 is disassembled as before, the partially consumed treats 20 are removed and replaced with new treats 20.

Figure 3:
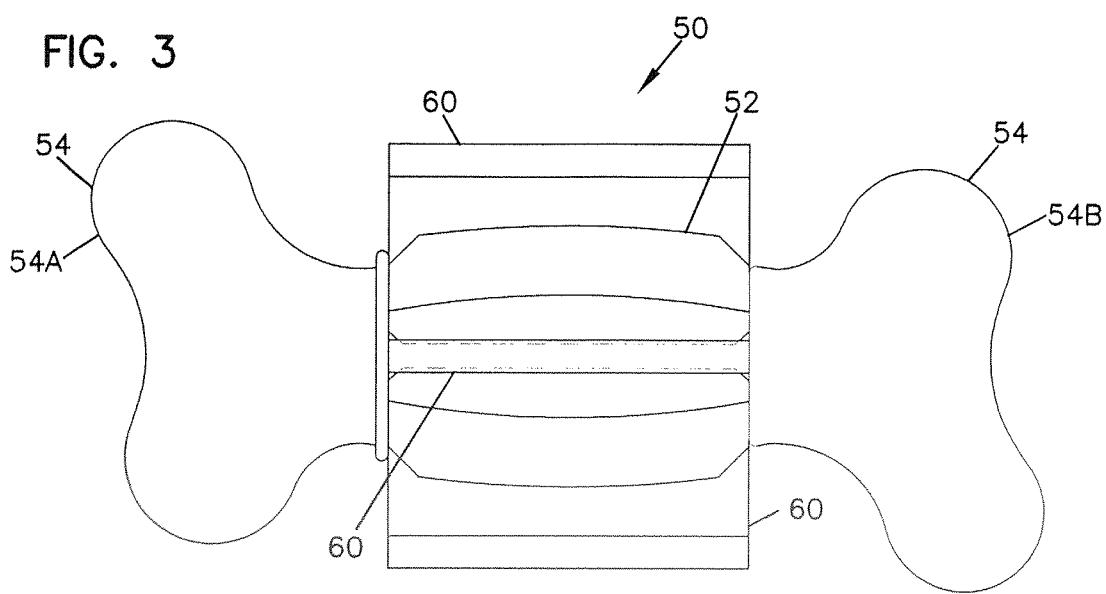
FIG. 3 is a plan view of a second embodiment of a pet toy according to the present invention having treats retained therein.
Figure 4:
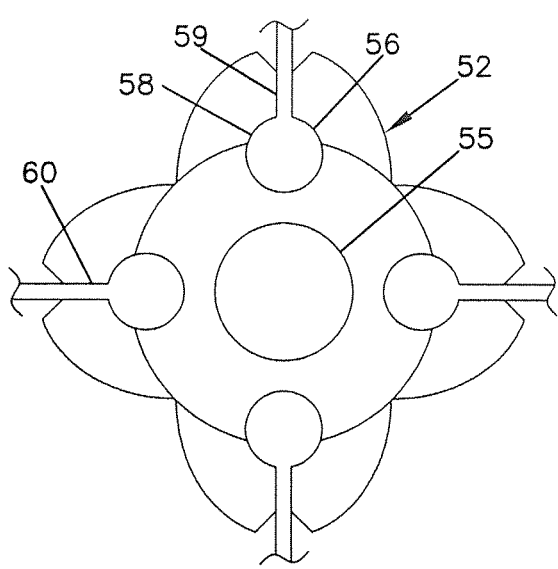
FIG. 4 is an end view of the base portion of the pet toy of FIG. 3 having treats retained therein.

Referring to FIGS. 3 and 4, a second embodiment of a pet toy according to the present invention is illustrated. Toy 50 of FIG. 3 has a first portion and a second portion that are connectable (e.g., engageable and disengageable) from each other, and toy 50 includes an edible treat or snack, which, once consumed or otherwise removed from toy 50 by the pet, can be readily replaced within toy 50.

Toy 50 includes a first portion, in this embodiment body 52, and a second portion, in this embodiment tip 54. In this particular embodiment, toy 50 has a first tip 54A and a second tip 54B positioned on opposite sides of body 52. Toy 50 has a longitudinally axis extending through tip 54A, body 52, and tip 54B. At least one of tips 54A, 54B is removable and replaceable onto body 52. Tip 54 (e.g., one or both tips 54A, 54B) is attachable to and removable from body 52 by an engagement mechanism, such as those described above in respect to toy 10.

In this embodiment, extending the length of body 52 is at least one edible treat 60, such as rawhide. In the illustrated embodiment, body 52 is configured to retain four treats 60, although three treats 60 are visible in FIG. 3 extending from tip 54A to tip 54B.

As seen in FIG. 4, toy 50 in this embodiment has a rounded cross-like shape, having a treat-retaining receptacle in each of its four arms. It is understood that body 52 may have other shapes, such as, e.g., cylindrical, oval, square, clover-shaped, etc. In this embodiment, body 52 has a slight taper proximate tips 54, seen in FIG. 3.

Returning to FIG. 4, body 54 includes a keyway 56 for accepting a portion of treat 60 therein. Keyway 56 includes an enlarged channel 58, allowing treat 60 to be slid therein (in the longitudinal direction) yet not removed in the radial direction (i.e., perpendicular to the longitudinal direction). Extending from channel 58, keyway 56 has a radial stem section 59 which terminates in a tapered or angled portion as it nears the surface of body 52. If present, the angled portion is typically at least about 15 degrees from the radially extending stem section 59, often at least about 30 degrees.

In one particular embodiment, a stem section having a width of 6 mm has a radially extending section of about 2 mm and a tapered section of about 2 mm. The tapered or angled portion facilitates the insertion of treat 60 into keyway 56, particularly into stem section 59, as will be described later.

As with toy 10, the two portions of toy 50 are preferably shaped so that a sufficient amount of the treat is not readily accessible to the pet. In addition, in this embodiment, tips 54A, 54B are sized so that treats 60 do not slide out from keyways 56 when toy 50 is assembled. In FIG. 3, tip 54A is illustrated as having a flange, to increase the radial diameter of tip 54A and thus increase the amount of treat 60 covered by tip 54A. In some embodiments, the tolerance between body 52 and tips 54 allows rotation of the elements (around a central shaft) in relation to one another.

Figure 5A:
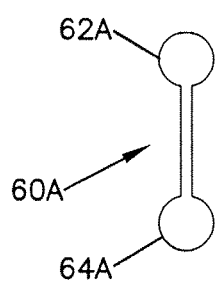
FIG. 5A is a first embodiment of an edible treat configured for inclusion with the pet toy of FIGS. 3 and 4.
Figure 5B:
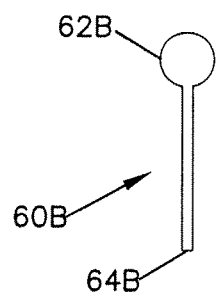
FIG. 5B is a second embodiment of an edible treat configured for inclusion with the pet toy of FIGS. 3 and 4.
Figure 5C:
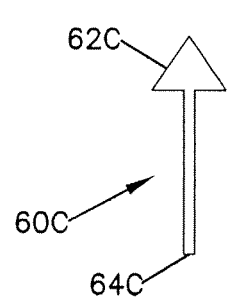
FIG. 5C is a third embodiment of an edible treat configured for inclusion with the pet toy of FIGS. 3 and 4.
Figure 5D:
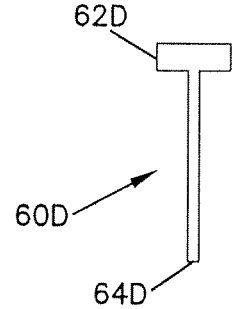
FIG. 5D is a fourth embodiment of an edible treat configured for inclusion with the pet toy of FIGS. 3 and 4.

Referring to FIGS. 5A through 5D, four exemplary embodiments of treats 60 suitable for use with toy 50 are illustrated. In each of these four embodiments, the treat includes a first proximal end for receipt into a keyway in the toy body, and an opposite distal second end exposed to the pet when positioned in the toy. In FIG. 5A, treat 60A has a bulbous proximal end 62A and a bulbous distal end 64A. In such an embodiment, ends 62A, 64A are generally the same, and the proximal and distal ends can be interchanged. In FIG. 5B, treat 60B has a bulbous proximal end 62B and a distal end 64B. In FIG. 5C, treat 60C has a triangular proximal end 62C and a distal end 64C. In FIG. 5D treat 60D has a rectangular proximal end 62D and a distal end 64D. It is understood that other shapes are suitable for the proximal end and/or the distal end.

To use toy 50, the pet owner disassembles toy 50; for example, toy 50 can be rotated to remove either a tip (e.g., tip 54A) from a central shaft (not shown), allowing the shaft with the other tip (e.g., tip 54B) to be removed from body 52. A treat 60 can be slid into keyway 56; typically, a treat 60 is slid into each keyway 56. The shaft is then slid back through body 52, after which tip 54A is replaced onto the shaft. The resulting assembled toy has four edible treats thereon; it is understood that in some embodiments, other numbers of treats may be used.

As described above in respect to toy 10, after chewing by the pet, treats 60 are at least partially consumed or otherwise removed. It is preferred that a portion of treat 60 is in accessible to the pet and remains on toy 50, to continue the pet's interest in toy 50. Depending on the pet, the pet may gnaw or chew so vigorously in an attempt to obtain the entire treat 60 that the pet damages body 52 with their teeth, leaving tracks in body 52. At stem section 59, these tracks sometimes result in burrs, which could extend into stem section 59, hindering insertion of the next treat 60. To reduce this occurrence, stem section 59 preferably includes the portion tapered or angled away from treat 60.

To replace the partially consumed treats 60, toy 50 is disassembled as before, the partially consumed treats 60 are removed and replaced with new treats 60. Based on the design of keyway 56, a tool may facilitate the removal of partially consumed treats 60 from keyway 56, particularly from channel 58. For example, the shaft of toy 50 could be configured as a suitable tool.

Figure 6:
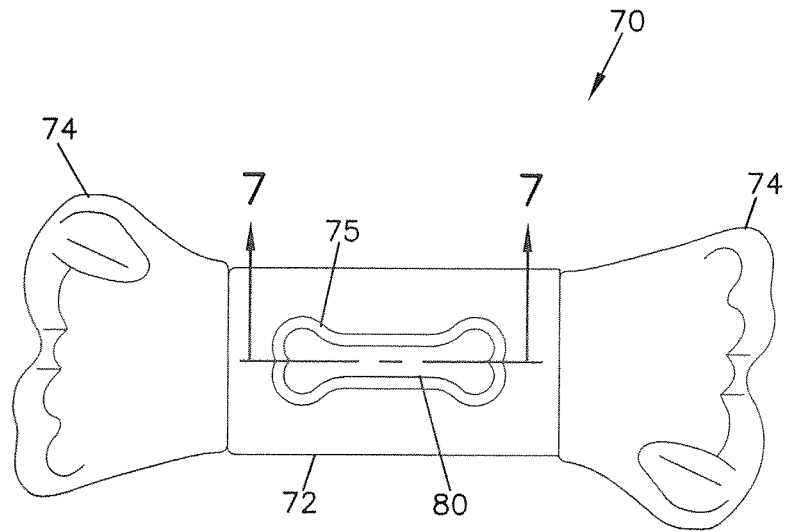
FIG. 6 is a plan view of a third embodiment of a pet toy according to the present invention having a treat-retained therein.
Figure 7:
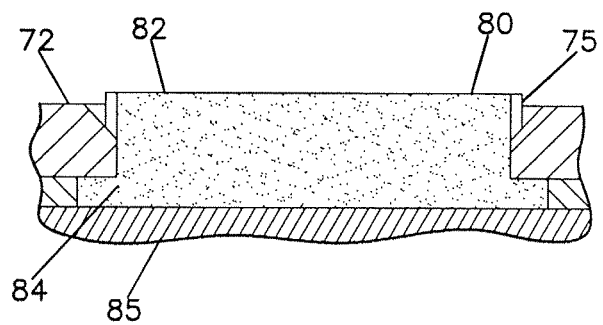
FIG. 7 is a cross-sectional view of a portion of the pet toy of FIG. 6 taken along line 7-7, illustrating the edible treat.

Referring to FIGS. 6 and 7, a third embodiment of a pet toy according to the present invention is illustrated. Toy 70 of FIG. 6 has a first portion and a second portion that are connectable (e.g., engageable and disengageable) from each other, and toy 70 includes an edible treat or snack, which, once consumed or otherwise removed from toy 70 by the pet, can be readily replaced within toy 70.

As with the previous embodiments, toy 70 includes a first portion, in this embodiment body 72, and a second portion, in this embodiment tips 74. At least one of tips 74 is removable and replaceable onto body 72 by an engagement mechanism, such as those described above in respect to toy 10.

In this embodiment, body 72 includes a treat-retaining aperture 75 there through for exposing a treat 80 retained within body 72. As seen in FIG. 7, one portion 82 of treat 80 is present within aperture 75 and another portion 84 of treat 80 is present inside body 72. Although in FIG. 7 portion 82 is illustrated generally flush with the outer surface of body 72, portion 82 may be configured to extend past body 72.

Treat 80 is held in position in aperture 75 by shaft 85, which also retains body 72 and tips 74 together. Shaft 85 exerts pressure against treat 80 and urges treat 80 against the inner wall of body 72 and into aperture 75.

To position treat 80 into toy 70, at least one of tips 74 is removed from body 72 and shaft 85 is removed from inside of body 72. Treat 80 is slid into body 72 and positioned proximate and preferably partially into aperture 75. Shaft 85 is replaced into body 72 and positioned so that shaft 85 exerts pressure against portion 84 of treat 80, holding treat 80 into aperture 75, Tips 74 and body 72 are reassembled to form toy 70.

Figure 8:
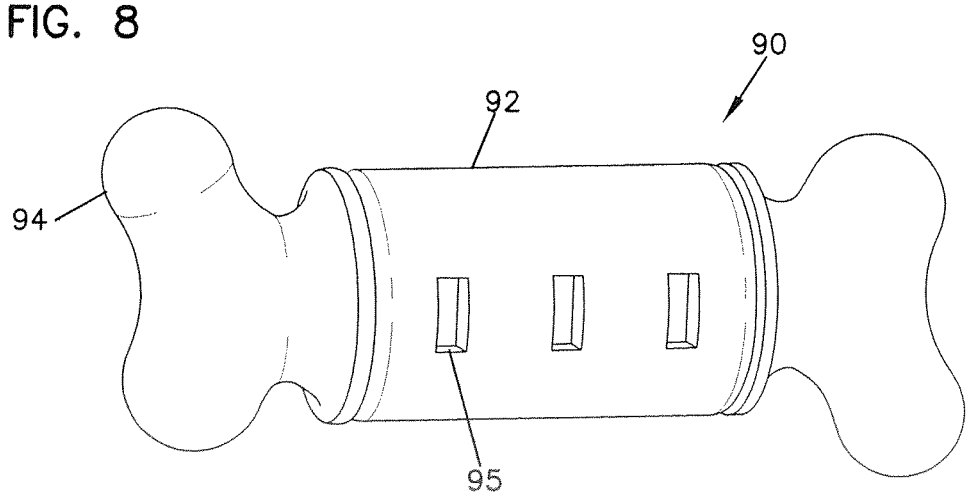
FIG. 8 is a perspective view of a fourth embodiment of a pet toy according to the present invention.
Figure 9:
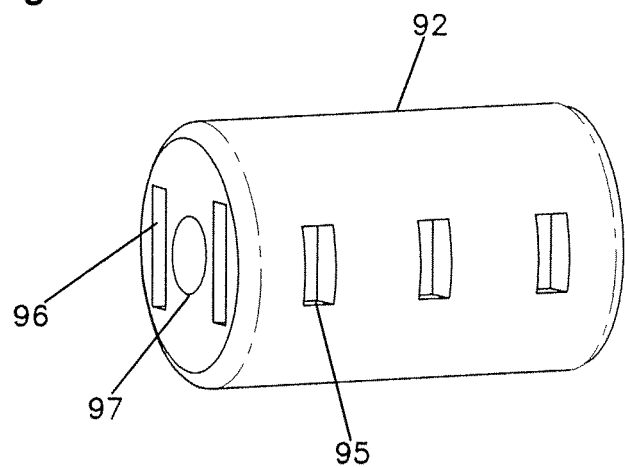
FIG. 9 is a perspective view of the base portion of the pet toy of FIG. 8.

Referring to FIGS. 8 and 9, a fourth embodiment of a pet toy according to the present invention is illustrated. Toy 90 of FIG. 8 has a first portion and a second portion that are connectable (e.g., engageable and disengageable) from each other, and toy 90 includes an edible treat or snack, which, once at least partially consumed or otherwise removed from toy 90 by the pet, can be readily replaced within toy 90.

As with the previous embodiments, toy 90 includes a first portion, in this embodiment body 22, and a second portion, in this embodiment tips 94. At least one of tips 94 is removable and replaceable onto body 92 by an engagement mechanism, such as those described above in respect to toy 10. In this embodiment, body 92 includes three apertures 95 there through for exposing a treat (not shown) retained longitudinally within a treat-retaining region of body 92. The treat is generally visible through apertures 95. As seen in FIG. 9, body 92 includes a slot 96 (in this embodiment, two slots 96) connected to the treat-retaining region and a central aperture 97 for receiving a shaft.

To position the treat into toy 90, at least one of tips 94 is removed from body 92. If present, any shaft may be removed from inside of body 92 via aperture 97. The treat is slid into slot 96 present in body 92 so that it is present at preferably each of apertures 95. Tips 74 and body 72 are reassembled to form toy 70.

In an alternate configuration, a slot (similar to slot 96) may be present in tip 94 for sliding the treat therethrough.

Figure 11:
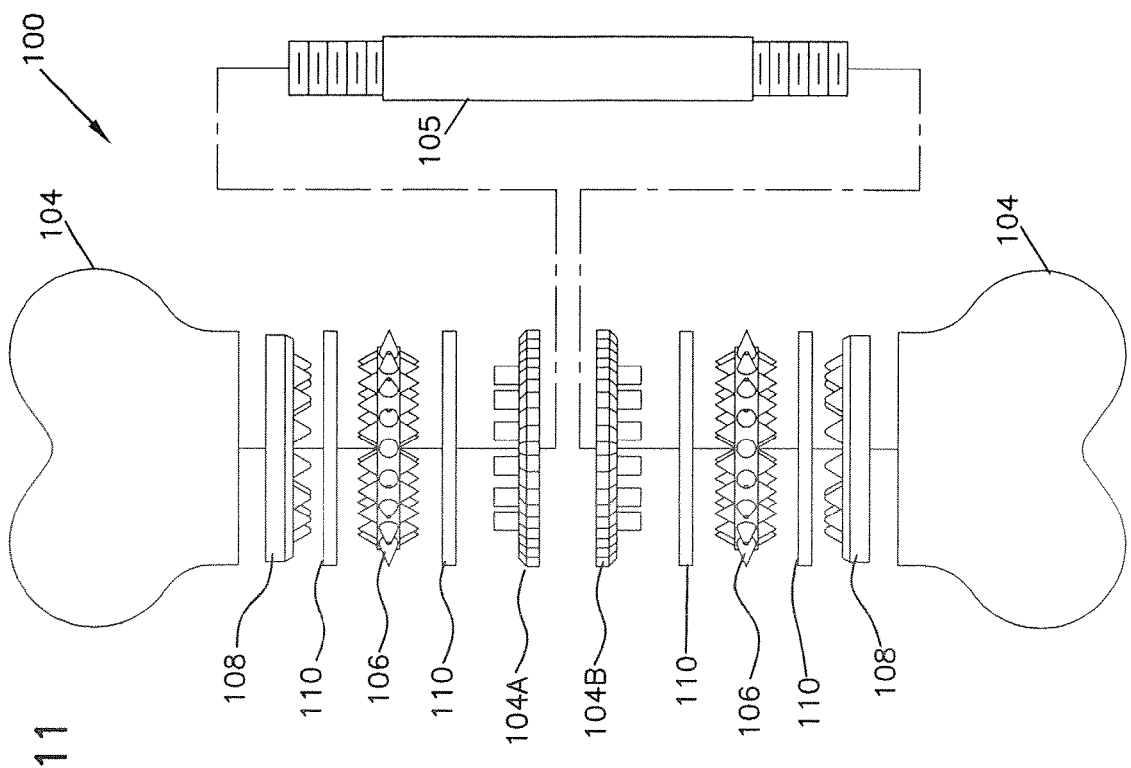
FIG. 11 is an exploded view of the dental toy of FIG. 10.
Figure 10:
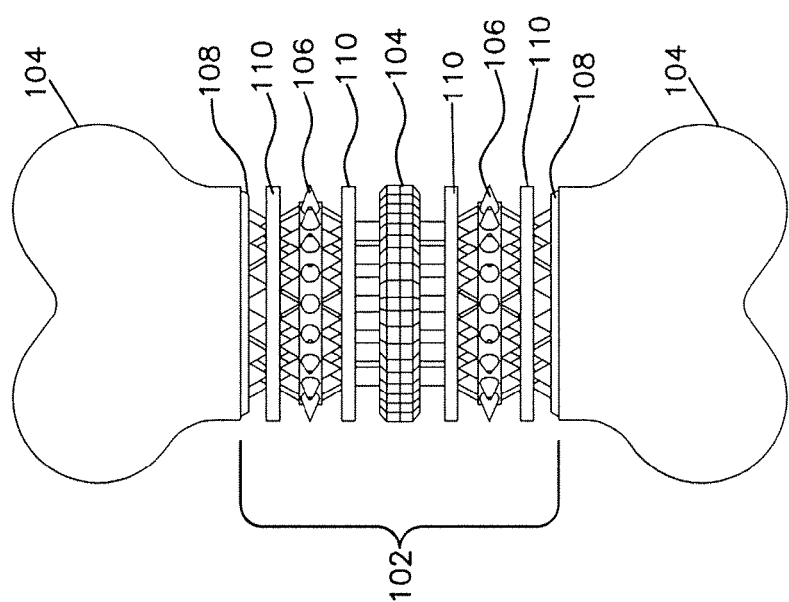
FIG. 10 is a plan view of a fifth embodiment of a pet toy according to the present invention, particularly, a dental toy, having treats retain therein.

Yet another embodiment of a pet toy according to the present invention is illustrated in FIGS. 10 and 11. Toy 100 has a first portion and a second portion that are connectable (e.g., engageable and disengageable) from each other, and toy 100 includes an edible treat or snack, which, once consumed or otherwise removed from toy 100 by the pet, can be readily replaced within toy 100. This toy 100 is particularly suited for cleaning a pet's teeth as it chews the toy; toy 100 may be referred to as a dental toy, dental cleaning toy, or the like.

As with the previous embodiments, toy 100 includes a first portion, in this embodiment body 102, and a second portion, in this embodiment tips 104. Toy 100 includes a shaft 105 for engaging tips 104 and body 102. At least one of tips 104 is removable and replaceable onto shaft 105 by an engagement mechanism, such as those described above. In the embodiment of FIG. 11, both ends of shaft 105 are threaded for engagement with tips 104.

Body 102 is composed of a plurality of sections which can be alternated with edible treats. In this embodiment, body 102 has a bristled portion 104 (composed of a first half 104A and a second half 104B), double-sided portions 106, and end portions 108. Alternatively positioned between portions 104, 106, 108 are treats 110. It is understood that treats 100 may be present in other than alternating arrangements.

Each of portions 104, 106, 108 is disc-shaped and includes features such as bristles, nubs, pyramids, dots, or protrusions, etc. that facilitate the removal of plaque and/or tarter from a pet's teeth. The features can be present on the side surfaces and/or the outer perimeter of portions 104, 106, 108. For example, portion 104 has these features (e.g., bristles) on both side surfaces, portions 106 have these features on both side surfaces and the perimeter, and portions 108 have these features on one side surface. When the pet gnaws at treats 110, the teeth contact the features on portions 104, 106, 108, which scrape and massage the gums and teeth, leading to a healthier mouth.

To position treat 110 onto toy 100, at least one of tips 104 is removed from shaft 105 and shaft 105 is removed from body 102. Treats 10 and portions 104, 106, 108 are slid onto shaft 105 in an alternating manner. Tips 104 and shaft 105 are reassembled to form toy 100.

Various embodiments of pet toys having a first portion and a second portion which engage together to retain the edible treat with the toy (e.g., either in or on the toy), until the treat is at least partially consumed or otherwise removed from the toy by the pet, have been described above. The following discussion is applicable to all of the embodiments described herein and to variations thereof.

The pet toys of this invention may be shaped and sized to accommodate the type and size of pet for which the toy is intended. For example, three different sizes of toy 10 may be available to accommodate dogs of different sizes, with the small size intended for the small dog such as a Toy Poodle, the middle size intended for a medium dog such as a Beagle, and the large size intended for a large dog such as a Labrador.

Any of a number of materials are suitable for the pet toys of this invention. Examples of materials suitable for the toys (e.g. base 12, base 52, tips 14, tip 54, shaft 15, etc.) include nylon, polycarbonate, rubber (natural or synthetic, either filled or unfilled), polyethylene, or other polymeric material. Combinations of materials may be used in an element. In many constructions, the first and second portions of the toy are made from different materials. For example, base 12 of toy 10 could be made from rubber and tips 14 could be made from nylon. For toy 50, base 52 could be polycarbonate and tips 54 could be nylon. As an example of an element having multiple materials, base 52 of toy 50 could be made with a nylon core having a rubber coating thereon. As another example, tips 74 (or any other of the tips) may have an insert having internal threads, the insert being made of a stronger material than the remainder of the tip. As yet another example, body portion 104 of toy 100 can be polycarbonate and portions 106, 108 can be rubber.

It is understood that the various embodiments, constructions, characteristics or materials of the various toys and their elements described above may be interchanged among the various embodiments while remaining within the scope of the invention. Additionally, it is understood that various modifications could be made to any of the elements described herein above while remaining within the scope of the invention. For example, although each of the tips (e.g., tips 14, 54, etc.) herein have been illustrated as bone-shaped, other shapes are of course suitable. As another example, any of the bases described could a different shape. For example, ball-shaped base 12 of toy 10 could be elliptical (football shaped), or cross-shaped base 52 of toy 50 could be cylindrical or elliptical.

These several examples above have merely been examples of possible variations of toys that are within this invention, and are in no way limiting the scope of the invention. Since many embodiments of the invention can be made without departing from the spirit and scope of the invention, the invention resides in the claims hereinafter appended.

What is claimed:

1. A pet toy comprising:
   (a) a first portion having a passage therethrough;
   (b) a shaft having a first end, a second end and a middle portion centrally located between the first end and the second end, the shaft extending through the passage of the first portion such that the first portion fully covers the middle portion of the shaft;
   (c) a second portion having an opening for receiving the first end of the shaft which releasably engages the second portion to the first portion;
   (d) a third portion having an opening for receiving the second end of the shaft which releasably engages the third portion to the first portion;
   (e) a treat-retaining region;
   (f) wherein the second and third portions are constructed such that the first and second ends of the shaft are fully embedded within the second and third portions respectively, the second and third portions remaining engaged to the shaft during pet use.

2. The pet toy of claim 1, wherein:
   (a) the shaft comprises external threads on the first end; and
   (b) the second portion comprises internal threads engageable with the threads on the shaft.

3. The pet toy of claim 1, wherein the treat-retaining region is present between the first portion and the second portion.

4. The pet toy of claim 1, wherein the treat-retaining region is present between the first portion and the second portion and between the first portion and the third portion.

5. The pet toy of claim 1, further comprising at least one edible treat in the treat-retaining region.

6. The pet toy of claim 5, wherein the first portion, second portion, and third portion are non-edible portions.

7. The pet toy of claim 5, wherein the edible treat is a flat, disc-shaped edible treat.

8. The pet toy of claim 1, wherein the first portion, second portion, and third portion are non-edible portions.

9. The pet toy of claim 1, wherein the first portion is ball shaped and the second and third portions are bone-tip shaped.

10. The pet toy of claim 1, where the pet toy has only four non-edible components, the four non-edible components consisting of the first portion, the second portion, the third portion, and the shaft.

11. The pet toy of claim 10, where the pet toy has only two edible components, the two edible components consisting of a first edible treat located between the first portion and the second portion, and a second edible treat located between the first portion and the third portion.

12. The pet toy of claim 1, wherein the second and third portions are bone-tip shaped.

13. A pet toy comprising:
(a) a base portion having a passage there through;
(b) first and second tip portions;
(c) a shaft configured for passing through the passage in the base portion;
(d) the shaft including first and second threaded ends that are releasably connected to the first and second tip portions such that first and second threaded ends are fully embedded within first and second tip portions respectively when connected, the base portion being located between the first and second tip portions and fully covering a middle portion of the shaft centrally located between the first and second threaded ends;
(e) first and second treat-retaining regions located between the base portion and the first and second tip portions; and
(f) an edible treat located in each of the first and second treat-retaining regions, wherein at least a portion of the edible treat is inaccessible to the pet during pet use.

14. The pet toy of claim 13, wherein each of the first tip portion and the second tip portion have internal threads.

15. The pet toy of claim 13, wherein the base portion and the tip portions are non-edible portions.

16. The pet toy of claim 13, wherein the tip portions and the shaft remain connected to one another with the base portion retained between the tip portions during pet use.

17. The pet toy of claim 13, wherein the first and second tip portions are bone-tip shaped.

18. A pet toy comprising:
(a) a shaft having a middle portion, a first end and a second end;
(b) a non-edible central piece located centrally between the first and second ends of the shaft and fully covering the middle portion of the shaft;
(c) first and second non-edible end pieces secured to the shaft at the first and second ends respectively such that first and second ends are fully embedded within first and second non-edible end pieces respectively; and
(d) a first edible treat located between the first end piece and the central piece and a second edible treat located between the second end piece and the central piece, the first and second end pieces remaining secured to the first and second ends of the shaft during pet use.

19. The pet toy of claim 18, wherein the first and second non-edible end pieces thread onto the first and second ends of the shaft.

20. The pet toy of claim 18, wherein at least a portion of each of the first and second edible treats is non-accessible during pet use.

21. The pet toy of claim 18, wherein the first and second non-edible end pieces are bone-tip shaped.

22. A pet toy comprising:
(a) a non-edible base portion having a first side and a second side;
(b) a first non-edible tip portion;
(c) a second non-edible tip portion;
(d) a first engagement mechanism releasably retaining a first edible treat between the first tip portion and the first side of the base portion wherein a portion of the first edible treat is in direct contact with the first tip portion and the base portion such that the portion of the first edible treat is inaccessible to a pet during use; and
(e) a second engagement mechanism releasably retaining a second edible treat between the second tip portion and the second side of the base portion wherein a portion of the second edible treat is in direct contact with the first second tip portion and the base portion such that the portion of the second edible treat is inaccessible to a pet during use; and
(f) wherein the base portion, the first and second tip portions, and the first and second edible treats are the only exposed components of the pet toy.

23. The pet toy of claim 22, further comprising a shaft releasably connected to the first and second tip portions by the first and second engagement mechanisms, respectively.

24. The pet toy of claim 23, wherein the shaft and the body are separable components.

25. The pet toy of claim 22, wherein the first engagement mechanism comprises threads on a first end of a shaft and threads on the first tip portion.

26. The pet toy of claim 22, wherein the first tip portion and the second tip portion each include a flange portion for seating directly against one side of the first and second edible treats, respectively.

* * * * *

UNITED STATES PATENT AND TRADEMARK OFFICE
CERTIFICATE OF CORRECTION

PATENT NO.         : 9,788,526 B2                                    Page 1 of 1
APPLICATION NO.    : 11/858675
DATED              : October 17, 2017
INVENTOR(S)        : Charles David Mann It is certified that error appears in the above-identified patent and that said Letters Patent is hereby corrected as shown below:

In the Specification

In Column 4, Line 10:
"toy 105" should be "toy 10"

In Column 7, Line 8:
"Alternatively" should be "Alternatingly"

In Column 7, Line 25:
"Treats 10" should be "Treats 110"

Signed and Sealed this
Twenty-sixth Day of March, 2019

Andrei Iancu
*Director of the United States Patent and Trademark Office*